April 16, 1963  C. A. KLEIN ETAL  3,086,117
SEMICONDUCTIVE DOSIMETERS
Filed July 20, 1959  2 Sheets-Sheet 1

INVENTORS
CLAUDE A. KLEIN
WOLF DETER STRAUB
BY H. Vincent Harsha
ATTORNEY

April 16, 1963    C. A. KLEIN ETAL    3,086,117
SEMICONDUCTIVE DOSIMETERS

Filed July 20, 1959    2 Sheets-Sheet 2

INVENTORS
CLAUDE A. KLEIN
WOLF DETER STRAUB
BY *H. Vincent Harsha*
ATTORNEY

United States Patent Office 3,086,117
Patented Apr. 16, 1963

3,086,117
SEMICONDUCTIVE DOSIMETERS
Claude A. Klein, Waltham, and Wolf Deter Straub, Cambridge, Mass., assignors to Raytheon Company, Lexington, Mass., a corporation of Delaware
Filed July 20, 1959, Ser. No. 828,360
3 Claims. (Cl. 250—83.1)

This invention relates generally to semiconductive devices useful in measuring nuclear radiation, and more particularly to a semiconductive dosimeter adapted to measure an integrated value of neutron radiation.

Devices which are useful in measuring effects of nuclear radiation have many applications in the art; for example, in determining the amount of exposure to which a person may have been subjected while in a given area in which radiation is present. As of now, no effective device has appeared which will give an integrated measure of neutron radiation, particularly when both fast and slow neutron radiation is involved.

Semiconductors are known to be quite sensitive to nuclear radiation damage, since the radiation-induced interstitial atoms and vacancies result in the formation of additional electronic energy levels in the forbidden band and the presence of these additional levels may be detected through changes in the conductivity and the Hall coefficient of the material. In the particular case of neutron radiation, a small portion of the neutrons which are in the thermal energy range are captured by lattice nuclei, and lead to the formation of impurity atoms which occupy substitutional positions in the lattice structure. However, these impurity centers have only a small effect upon the conductivity characteristics of the semiconductive material, and ordinarily cannot be used as a measure of radiation. Thus, in order to measure the total amount of neutron radiation where a large neutron flux is composed of both fast neutrons, and slow or thermal neutrons, it is necessary to devise some method for effectively measuring and integrating the amounts of both types of neutrons. To accomplish this, it is proposed to provide a slow neutron fission action which yields fast charged particles or ions, thereby enabling enhanced, highly localized radiation damage to be done to the semiconductive body, which damage may then be used as a measure of the slow neutron dosage.

Accordingly, the present invention is directed toward the realization of a semiconductive dosimeter structure in which a semiconductor body may be exposed to nuclear radiation, and then measurements may be made on the device to indicate the amount of neutron dosage present.

It has further been found that small amounts of material having a large capture cross-section for thermal neutrons, and yielding either $\alpha$ particles or fission products when bombarded with neutrons may be utilized in combination with the semi-conductive body in order to measure the total amount of neutron radiation. Briefly, one embodiment of the present invention may comprise a device having at least two semiconductive bodies contained within the same envelope, one of which will measure the amount of fast neutron radiation, while the other is adapted to effectively measure the amount of both fast, and slow or thermal neutron radiation. In this embodiment, the semiconductor body, which is adapted to measure the slow or thermal neutron radiation, has positioned in its near vicinity a foil or body of material capable of converting the slow neutrons to fast charged particles. This enables measurement in a mixed field of radiation which contains both fast and slow neutrons, and in which no measurement could otherwise be made of the slow neutron radiation. Alternatively, the two bodies need not be contained in the same envelope, but may be positioned in different envelopes, since each body is independently used in making its respective radiation measurement.

In still another embodiment, the dosimeter may comprise the combination of a converter and a semiconductor body in the form of a thin wire positioned within a cylindrical tube so that the wire of semiconductive material is irradiated on all surfaces by the radiation which it is desired to measure.

The invention will be better understood as the following description proceeds taken in conjunction with the accompanying drawings wherein.

Figure 1:
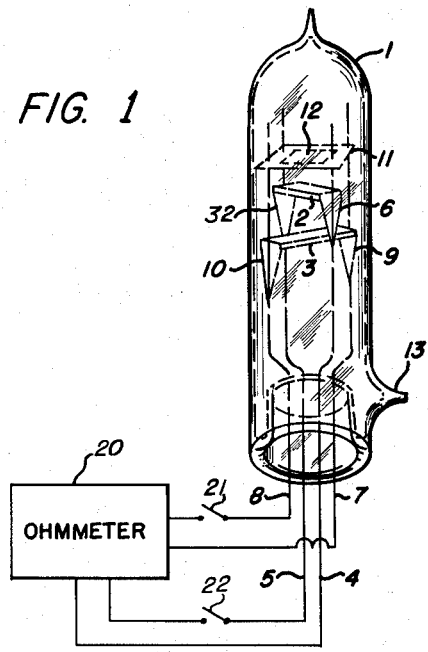
FIG. 1 is an isometric view of a semiconductive dosimeter according to the invention in which provision is made for measuring both slow and fast neutrons.

Referring now to the drawings and more particularly to FIG. 1 thereof there is shown a semiconductive dosimeter comprising an outer envelope 1, which preferably consists of material which is not damaged by neutron radiation, and which does not become radioactive when exposed to nuclear radiation. In FIG. 1, the envelope 1 may be of glass, for example, which has a low boron content, such as lead glass. Included within envelope 1 are two bodies of semiconductive material 2 and 3, respectively, which may be germanium, for example. The body 2 is made relatively thin as compared to the body 3, in order to effectively measure the thermal or slow neutron radiation when the device is exposed to a neutron flux, while the body 3 functions to measure the fast neutron radiation. A plurality of conductive leads, for example, made of nickel, are connected to the germanium chips through the medium of nickel tabs, attached to the chips. The leads 4 and 5 are respectively connected to tabs 6 and 32 attached to chip 2, while leads 7 and 8 are respectively connected to tabs 9 and 10 attached to the body 3. Positioned above the body 2, and in relatively close proximity thereto, is a member of insulating material 11, such as Teflon, which has adhered thereto a body 12 of lithium$^6$. The Teflon member may be supported by the leads as shown. Preferably, the envelope 1 is evacuated so that a substantial vacuum exists within the envelope. The bodies 2 and 3 are also preferably of high resistivity P-type germanium, since if N-type germanium were used, it would be possible to obtain two readings for the same flux exposure, as reference to the humped portions of the curves of FIGS. 2 and 3 will show. However, it should be understood that if N-type germanium were initially used, the characteristics required for the present device could be obtained by pre-exposing the N-type germanium chip to a predetermined amount of fast neutrons in order to obtain the required P-type characteristic. In practice, it has been found that pre-exposing an N-type chip to about $2 \times 10^{13}$ neutrons will produce enough lattice defects to compensate the excess donors. In the event that the bodies 2 and 3 were fabricated of silicon, rather than germanium, either P-type or N-type silicon could be used.

In actually constructing the device shown in FIG. 1, individual chips of germanium were cut from an intrinsic germanium crystal, and a chip was then soldered to two nickel leads with a pure lead solder. The contact area of the chip was masked with polystyrene and a small 1/16" thick lime glass plate, the glass plate being mounted below the chip using polystyrene as an adhesive. The germanium chip was then etched in a standard CP-4 etch until resistance measurements indicated a proper thickness of the chip of approximately 0.001 inch. After removing the mask, this chip was then utilized as the germanium body 2 of FIG. 1. Similarly, additional chips were prepared, which had a final thickness of approximately 0.008 inch. This second batch of chips was coated with a layer of polystyrene, and one of them was utilized as the germanium body 3. Since the chip 3 functions to measure the fast neutron flux, the coating of polystyrene is necessary to prevent any stray alpha particles or tritons resulting from the reaction of thermal neutrons with lithium$^6$ from striking chip 3 and producing a response therein. Thus, differentiation is achieved between fast neutron detection, and thermal neutron detection. The "thick foil" of germanium, i.e., body 3, had final dimensions of 2.87 x 2.46 x 0.2 mm., while the "thin foil" of germanium, i.e., body 2, had final dimensoins of 2.69 x 2.91 x 0.025 mm.

The lithium$^6$ blanket 12 should be of a thickness such as to prevent significant slowing down of the $\alpha$ particles and the tritons emanating from the blanket after being bombarded by thermal neutrons. It was found that this could be best attained if the thickness of the lithium$^6$ foil was on the order of 0.0001 inch. A thickness of blanket 12 on this order is preferably attained by plating the lithium$^6$ on to a suitably chosen, electrically insulated metal support, the Teflon support member 11. Alternatively, the lithium$^6$ blanket 12 could be formed by rolling lithium in lump form to the appropriate thickness in a kerosene bath, and then placing it on the support member 11. Although some oxidation of the lithium will take place during the latter process, and attaining the desired thickness is more difficult, it is still possible to prepare the lithium foil 12 in this manner, and have it perform its function.

In order to package the device, the lead glass bulb 1 was mounted on a vacuum system which had provisions for the introduction of helium atmosphere into the bulb while the germanium chips 2 and 3, and the foil 12 were being mounted. The helium itself was purified by blowing it through a liquid nitrogen trap. The bulb 1 also had an exhaust tube attached to its side, as at 13, so that during the entire encapsulation process, helium could be blown across the dosimeter in order to protect the lithium foil 12 from oxidation. The lithium foil 12, which had been previously prepared with the desired thickness and kept in kerosene, was rapidly glued to the Teflon member 11, which had been previously mounted above the germanium body 2. As soon as the lithium was in place, the Teflon member 11 was pushed down to the appropriate distance from the germanium chip 2. The entire base assembly was then fused into a bulb, and the tube 1 evacuated and properly sealed.

Figure 2:
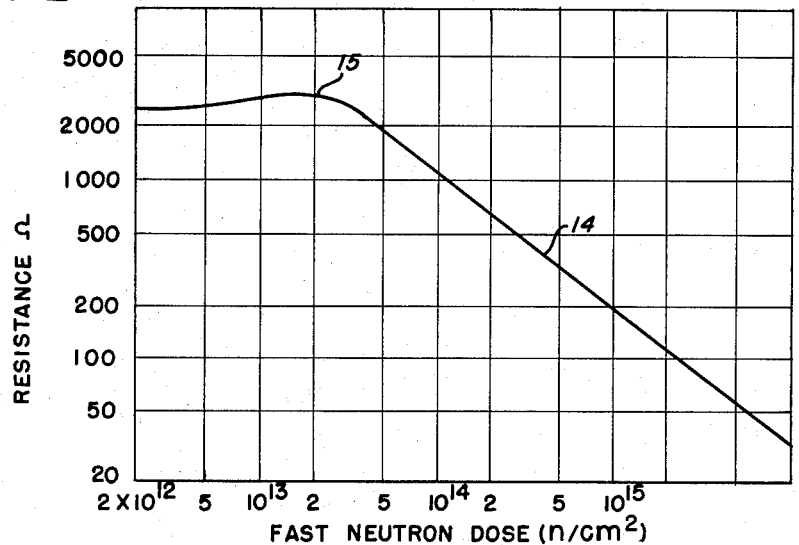
FIG. 2 is a calibration chart useful in determining the amount of fast neutron exposure.

As was previously pointed out, the germanium bodies 2 and 3 are preferably of very high P-type resistivity material. However, in fabricating the device of FIG. 1, the germanium bodies 2 and 3 originally presented a slight N-type characteristic, and had to be pre-exposed to a neutron dose of $2 \times 10^{13}$ as heretofore explained. The calibration curve for a fast neutron dose, as shown in FIG. 2, was obtained on the basis of measurements made on such an N-type crystal, and therefore it should be emphasized that its validity is thus restricted to fast neutron distributions usually found within the lattice of a uranium-graphite pile. Thus, the portion of curve 14, which lies to the right of the humped portion 15, represents the linear response which is attained once the germanium is made to exhibit P-type characteristics.

Figure 3:
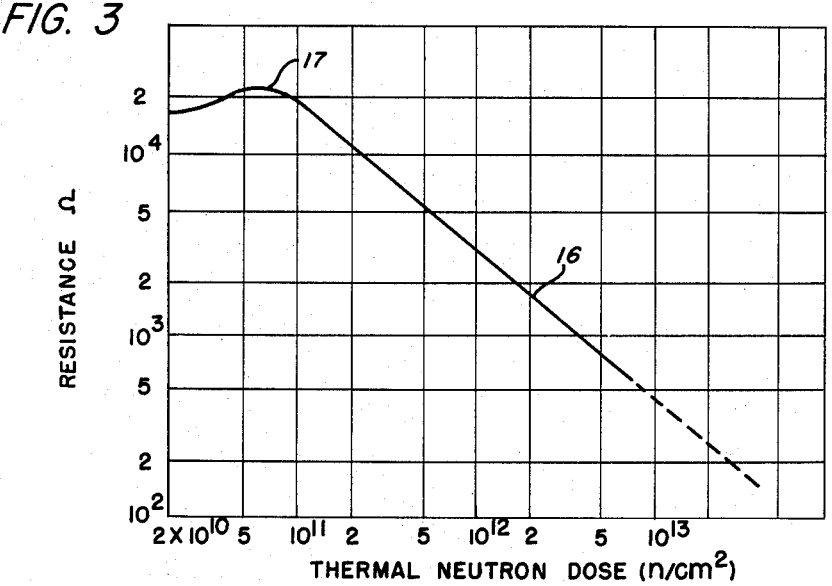
FIG. 3 is a calibration chart useful in determining the amount of slow or thermal neutron exposure.

A calibration curve, shown in FIG. 3, was devised for the germanium body 2, which functions primarily to measure the thermal neutron dose. As with the curve of FIG. 2, the straight line portion 16 of this curve, which lies to the right of the humped portion 17, indicates the response obtained with high-restivity P-type germanium. This curve was devised utilizing the fact that the number of Frenkel defects created in the germanium chip 2 by an integrated thermal flux will have an order of magnitude of $0.1 \times (nvt)_{th}$. Since the number of defects created in the same foil by an integrated reactor fast flux can be determined assuming 1.6 defects per square centimeter per fast neutron at room temperature, it is therefore possible to establish that insofar as the amount of damage produced in a thin germanium foil concerned, that the converted thermal neutrons are about 300 times as effective as fast neutrons. As was the case with the fast neutron detecting element, a preliminary exposure is required to obtain the desired P-type characteristics. A preliminary dose of about $10^{11}$ thermal neutrons was found sufficient to result in a P-type foil.

In connection with the evaluation of a neutron dose, one is usually faced with the problems related to the neutron energy distribution. In general, a large portion of the neutron energy spectrum is of very low energy, that is, much lower than the damage threshold of approximately 300 electron volts for the case of germanium. The present invention revolves around the discovery that it is possible to use the same semiconductor device to measure such low energy particles if means can be found to convert the slow or thermal neutrons into other types of bombarding particles which are capable of causing substantial damage. The foil of lithium$^6$ 12, arranged as shown in FIG. 1 in which two germanium chips are used, one of which is in proximity to the lithium foil, while the second is shielded from it, functions to convert the thermal neutrons into $\alpha$ particles and tritons which inflict a measurable amount of damage on the chip 2. Resistance measurements of the two chips, after proper calibration, will indicate the "fast neutron dose," that is from approximately $3 \times 10^4$ to $3 \times 10^7$ rep. (neutron energies greater than 300 electron volts), as well as the "thermal neutron dose" from approximately $0.8-3 \times 10^3$ rep.

In utilizing the device shown in FIG. 1, it may be placed into an exposed area for a length of time sufficient to obtain a reading, and then measurements may be made of a resistance of chips 2 and 3. Since the amount of nuclear radiation which impinges on these chips and causes damage, bears a definite proportionality to the resistivity of the germanium bodies 2 and 3, a simple resistance measurement provides an indication of an integrated amount of neutron radiation in the area of exposure. An ohmmeter 20 is connected to leads 4 and 5, and to leads 7 and 8. Switches 21 and 22 may be closed in order to obtain resistance measurements of the chips 2 and 3. The ohmmeter measurement made across the leads 4 and 5 provides an indication of the amount of thermal neutron radiation, while the measurement made across the leads 7 and 8 gives an indication of the amount of fast neutron radiation. Once the resistance of the germanium bodies has been determined, recourse may then be had to the logarithmically plotted calibration charts shown in FIGS. 2 and 3 in order to determine the amount of the neutron dose. The graph shown in FIG. 2 would be utilized in conjunction with the resistance measurement obtained on the body 2.

Figure 4:
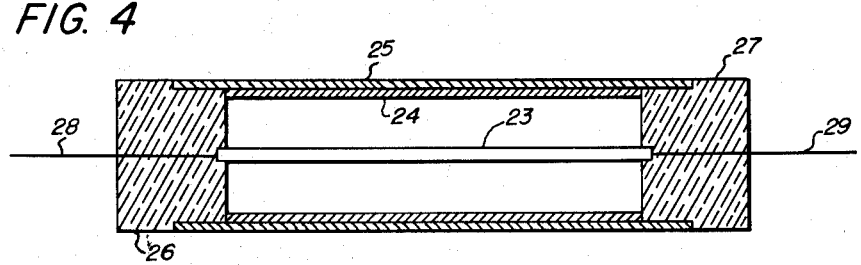
FIG. 4 is a sectional view of a second form of dosimeter according to the invention in which a semiconductive body is in the form of a thin cylindrical wire.

FIG. 4 shows a slightly different embodiment of a dosimeter in accordance with the present invention in which a germanium body 23 is provided in the form of a thin cylindrical wire. Surrounding the germanium rod 23 is a foil 24 of lithium$^6$ which is placed adjacent to the inner surface of a tungsten tube or envelope 25. Alternatively, the envelope 25 could be made of any other material which does not become radioactive with neutron irradiation such as aluminum, stainless steel, etc. The ends of envelope 25 have plugs 26 and 27 of a suitable insulating material position therein, and the tube may be evacuated as with the embodiment of FIG. 1. Conductive leads 28 and 29 are connected to opposite ends of the germanium rod 23. In this form of dosimeter only the amount of thermal neutron radiation present may be determined by a resistance measurement of body 23. However, more sensitive measurements of the neutron dose may be obtained due to the fact that the cylindrical body 23 is bombarded on all its surface area by charge particles emanating from the lithium[6] foil 24. If desired, a second, coated, germanium body could be included in the tube 25, or external to the tube, for measuring the amount of fast neutron radiation.

Figure 5:
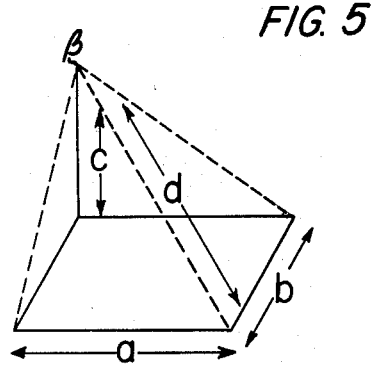
FIG. 5 is a sketch showing the solid angle subtended by the area which is exposed to the neutron radiation.

In FIG. 5 there is shown a diagram illustrating the effect of the geometrical relationship between the lithium[6] blanket 12 and the germanium chip 2. The solid angle $\beta$ is subtended by the rectangular window having the dimensions $a$ and $b$, the area of the window representing the surface area of the chip 2 which faces the lithium[6] blanket 12. The apex of the angle represents any given point on the bottom surface of the blanket 12. The solid angle $\beta$ may be represented by the equation $$(1) \quad \beta = \tan^{-1}\left(\frac{ab}{cd}\right)$$

As applied to the device of FIG. 1, for which a distance on the order of one millimeter between the blanket 12 and the germanium body 2 appears to be adequate, Equation 1 indicates that the efficiency with which $\alpha$ particles and tritons emanating from the blanket 12 strike the germanium chip 2 varies between approximately 23 percent and 82 percent. It can further be shown that the number of efficient disintegration, $N_1'$, induced by a slow neutron dose ($nvt$) can be expressed as the simple relationship $N_1' \simeq 0.01 \times (nvt)$. It follows that a dose of ($nvt$) thermal neutron creates approximately ($nvt$) Frenkel defects in the germanium foil 2.

Figure 6:
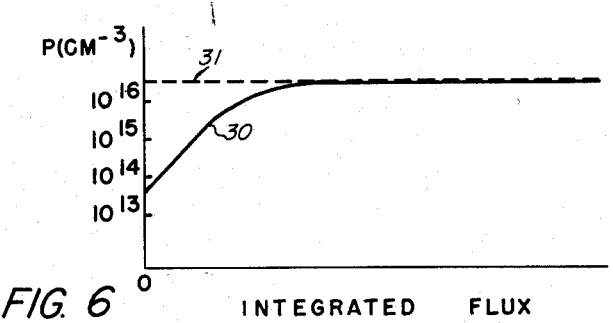
FIG. 6 is a schematic diagram showing the effect of nuclear radiation on the carrier concentration of high resistivity P-type germanium.

The sensitivity of the dosimeter of the present invention can be estimated from the fact that prolonged bombardment will ultimately produce material which is P-type, and which has a carrier concentration such that the Fermi level lies at about 0.123 electron volt above the valence band. As shown in FIG. 6, the conductivity of the detector tends to reach an upper limit of saturation. This limit occurs for integrated slow neutron fluxes larger than approximately $10^{14}$ neutrons/cm.[2]. Thus, it seems feasible to measure slow neutron doses in the range of 0.3 to 3,000 rep., ($10^{10}$ to $10^{14}$ neutrons/cm.[2]). Most of the biologically significant neutron doses lie within this range.

As has been pointed out, the dosimeter of the present invention has been described with respect to the use of germanium and a lithium[6] converter, the blanket 12 positioned above body 2 acts as a converter for converting the flow of thermal neutrons into charged particles which strike body 2. If lithium is used for this purpose, lithium[6] has been found to be the only lithium derivative which may successfully perform this function. However, it should be understood that other types of semiconducting materials, and other types of converting materials may equally as well be used. For example, silicon may be used as the semiconductor, or semiconductors from the class known as intermetallic compounds may also be used.

It has been found that boron[10] may be used as the converter, in which case only $\alpha$ particles will be emanated from the boron when subjected to a mixed neutron flux. Additionally, a fission material such as uranium 235 may be used as the converter, in which case the charge particles will be fission particles.

It can thus be seen that a semiconductor dosimeter has been provided in which it is possible to measure dosages of neutrons in a flux composed of fast and slow neutrons in a mixed field. The device is insensitive to the intense background $\gamma$ rays present in most neutron fields. The device has a wide range of sensitivity, and has flexibility of easy electrical measurements.

Although there have been described what are considered to be preferred embodiments of the present invention, various adaptations and modifications thereof may be made without departing from the spirit and scope of the invention as defined in the appended claims.

What is claimed is:

1. A semiconductive dosimeter comprising an envelope, a thin wire of semiconductive material substantially wholly of one electrical conductivity type positioned in said envelope, and a body of neutron converting material positioned within said envelope and surrounding said wire.

2. A dosimeter for measuring nuclear radiation comprising at least one body of semiconductive material substantially wholly of one electrical conductivity type positioned within a substantially evacuated housing, and a body of material capable of converting thermal neutrons into fast particle radiation positioned within said housing and adjacent to said semiconductive body.

3. A semiconductive dosimeter comprising an evacuated housing having a first semiconductive body substantially wholly of one electrical conductivity type positioned therein for measuring fast neutron radiation, a second body of semiconductive material substantially wholly of one electrical conductivity type positioned therein for measuring slow neutron radiation, and a body of material capable of converting slow neutron radiation into fast particle radiation positioned adjacent said second semiconductive body.

References Cited in the file of this patent

UNITED STATES PATENTS

| | | |
|---|---|---|
| 2,288,718 | Kallmann et al. | July 7, 1942 |
| 2,440,167 | Broxon et al. | Apr. 20, 1948 |
| 2,506,419 | Graves | May 2, 1950 |
| 2,564,626 | MacMahon et al. | Aug. 14, 1951 |
| 2,604,598 | Mead et al. | July 22, 1952 |
| 2,670,441 | McKay | Feb. 23, 1954 |
| 2,753,462 | Moyer et al. | July 3, 1956 |
| 2,761,071 | Hurst | Aug. 28, 1956 |
| 2,774,887 | McMaster et al. | Dec. 18, 1956 |
| 2,867,727 | Walker et al. | Jan. 6, 1959 |
| 2,899,560 | Nemet | Aug. 11, 1959 |
| 2,909,662 | Von Hippel et al. | Oct. 20, 1959 |
| 2,920,204 | Youmans | Jan. 5, 1960 |
| 2,988,639 | Welker et al. | June 13, 1961 |

OTHER REFERENCES

Vavilov et al.: "The Effect of Fast Neutron Irradiation on . . . Germanium Crystals," Soviet Physics, JETP, November 1957, pp. 579 to 582.